(12) United States Patent
Granier et al.

(10) Patent No.: US 7,648,106 B2
(45) Date of Patent: Jan. 19, 2010

(54) CONTROL SYSTEM INCLUDING TWO CONTROL COLUMNS THAT ARE COUPLED TO ENABLE CONTROLLED MEMBERS TO BE PLACED IN REQUIRED POSITIONS

(75) Inventors: Eric Granier, Chatillon (FR); Jérémie Guerard, Chatillon (FR); Max-Maurice Viet, Groslay (FR)

(73) Assignee: Dassault Aviation, Paris (FR)

( * ) Notice: Subject to any disclaimer, the term of this patent is extended or adjusted under 35 U.S.C. 154(b) by 513 days.

(21) Appl. No.: 11/476,767

(22) Filed: Jun. 29, 2006

(65) Prior Publication Data
US 2009/0314901 A1    Dec. 24, 2009

(30) Foreign Application Priority Data
Jun. 30, 2005    (FR) .................................. 05 06715

(51) Int. Cl.
*B64C 13/12*    (2006.01)
(52) U.S. Cl. ...................... 244/223; 244/229
(58) Field of Classification Search ............... 244/221, 244/223, 228, 229, 234
See application file for complete search history.

(56) References Cited

U.S. PATENT DOCUMENTS

| | | | |
|---|---|---|---|
| 5,125,602 A | 6/1992 | Vauvelle | |
| 5,291,113 A | 3/1994 | Hegg et al. | |
| 5,900,710 A | 5/1999 | Gautier et al. | |
| 6,000,662 A | 12/1999 | Todeschi et al. | |
| 6,644,600 B1 * | 11/2003 | Olson et al. | ......... 244/221 |
| 2002/0135327 A1 | 9/2002 | Szulyk et al. | |

* cited by examiner

*Primary Examiner*—Rob Swiatek
(74) *Attorney, Agent, or Firm*—Jacobson Holman PLLC

(57) ABSTRACT

A control system for placing controlled members in required positions including two control columns assigned to the controlled members to be moved, each control column having two degrees of freedom. Two actuators controlled by two control circuits apply to their associated control column either a resisting torque or a displacement torque. Each control column is provided with a mechanical spring system spring-loading the associated control column into its neutral position and adapted to provide, in the event of manipulation of the corresponding control column, a resisting torque in support of the resisting torque supplied by the associated actuator.

15 Claims, 5 Drawing Sheets

CONTROL SYSTEM INCLUDING TWO CONTROL COLUMNS THAT ARE COUPLED TO ENABLE CONTROLLED MEMBERS TO BE PLACED IN REQUIRED POSITIONS

BACKGROUND OF THE INVENTION

The present invention relates to a control system including two control columns that are coupled to enable controlled members to be placed in required positions.

The invention relates more particularly, although not exclusively, to the application of a control system of the above kind to positioning the control surfaces—in particular the pitch and roll control surfaces—of an aircraft having a cockpit with dual controls.

The document U.S. Pat. No. 5,291,113 discloses an aircraft control system of the above type comprising two control columns, each of which is mounted on a gimbal and has two degrees of freedom assigned to the respective controlled members to be moved, and, for each of said control columns, and assigned to said respective degrees of freedom:

a) two actuators for applying to their associated control column either a resisting torque or a displacement torque for the associated degree of freedom, b) two control circuits each of which is adapted:

on the one hand, to control the actuator for the associated degree of freedom so that it supplies a resisting torque opposing each manipulation of a first of the control columns exerted for that degree of freedom, and on the other hand, to bring about, as a function of said manipulation of the first control column, a displacement of the second control column of the same amplitude, in the same direction and for the same degree of freedom, c) two control column position detectors for supplying to the respective control circuits an associated control column position input signal, said control system further comprising:

d) means for controlling displacement of said controlled members as a function of signals supplied by said sensors.

In the above prior art control system, each control circuit is entirely electronic, the control columns being loaded by electric motors that alone provide the displacement torques and the resisting torques exerted on the control columns.

Consequently, in the event of a failure in the control system, in particular an electrical failure, not only is the coordination of the movement of the two control columns compromised but also the resisting forces can no longer be applied to the control columns, which seriously compromises safety, and is unacceptable in many situations and in particular in the field of avionics.

An object of the invention is to propose a control system of the indicated type that does not have these drawbacks.

SUMMARY OF THE INVENTION

The invention therefore consists in a control system as defined above that is noteworthy in that each control column is further provided with a mechanical spring system comprising for each of said degrees of freedom a return spring assembly for spring-loading the associated control column into its neutral position and adapted to provide, in the event of manipulation of the corresponding control column, a resisting torque in support of the resisting torque supplied by the associated actuator.

Thanks to these features, in the event of failure of any electronic component of the control system, the latter retains the capability to position the members to be moved, the resisting forces then being produced by the mechanical spring means.

In this kind of situation the control system will undoubtedly operate in a degraded mode, because the control columns will no longer be coupled to each other, but safe operation in respect of the members to be moved will continue to be provided.

The invention therefore provides a decisive advantage over the prior art, in particular in the avionics field, because the members to be moved, to be more precise the pitch and roll control surfaces, can still be operated in complete safety in the event of an electrical failure of the control system, with slightly reduced resisting forces supplied exclusively by the mechanical spring systems.

According to another advantageous feature of the invention, the characteristics of said return spring assemblies are selected so that in the absence of resisting torques supplied by said actuators caused by a failure they generate approximately 90% of the respective total resisting torques that are applied to the control columns when said actuators supply their corresponding resisting torques in the normal way.

According to another advantageous feature of the invention, said control circuits may be adapted to control said associated actuators in such a manner as to generate at least one end of travel stopping point felt when manipulating said control columns in both directions of displacement thereof for each of said degrees of freedom.

In this case, for increased safety, it may be preferable for the control circuit associated with at least one of said degrees of freedom to be adapted to control said associated actuators in such a manner as to generate two successive mechanical stopping points of which one is a stopping point that can be overridden and the other is an end of travel stopping point, these stopping points being felt when manipulating the control column in at least one direction for the degree of freedom concerned.

This feature may prove particularly beneficial in applications of the invention to controlling the pitch control surface of an aircraft, the two successive stopping points then being imposed on the movements of the control columns that cause the nose of the aircraft to dip, a high dip angle being obtainable in this case only after overriding the first stopping point.

In one particularly advantageous embodiment of the invention, each of said control circuits may comprise two interconnected control loops assigned to a degree of freedom of each of said control columns and each comprising an amplifier for supplying a drive signal to said actuators and adder means that are connected to the input of the amplifier and to which said sensors for each control column assigned to the same degree of freedom are connected, the output signals of said sensors being applied to said adder means with opposite signs.

In this case, each of said control loops may advantageously include first and second variable gain amplifier means respectively connected between said sensors and said adder means, said variable gain amplifier means determining in said control loop for respective movements of the control columns on either side of a neutral point thereof predetermined laws of variation of the resisting torque generated by the actuator controlled by that loop as a function of the displacement of the respective control column concerned.

Said predetermined variation laws may be linear or quasi-linear. In this case it may be advantageous if the linear or quasi-linear variation laws respectively associated with each degree of freedom of the control columns have different slopes for displacements of those control columns to either side of their neutral point.

This makes it possible to take account of particular ergonomic conditions which mean that the forearms of a person have a different strength according to whether exerting force toward the body or away from it.

The variable gain amplifier means of the control loops assigned to at least one of the degrees of freedom can be switched to reverse the slopes of the corresponding variation laws according to whether the control column concerned is to the left or to the right of a user, storage means being provided in each of the control loops assigned to the same degree of freedom to maintain the slopes of the variation laws until the direction of displacement of the control column is reversed.

This feature proves particularly advantageous in the particular situation where the control system is installed in a cockpit in which the pilot and the co-pilot are seated side by side. This feature then solves the problem of the different layout of the control columns, respectively to the left of the pilot and to the right of the co-pilot.

It may also be advantageous if each of said control loops includes electronic filters to produce a damping effect in the control of the movements of the control columns.

Means may be provided for rendering said control circuits inoperative if position signals supplied by said sensors assigned to the same degree of freedom differ from each other by a predetermined amount.

This feature decouples the control columns from each other in the event that the users of the two control columns apply contradictory control actions simultaneously.

According to another feature of the invention, said actuators are preferably three-phase electric motors controlled by sinusoidal currents.

In this case means may advantageously be provided for short-circuiting the windings of said electric motors to damp the movements of the control columns when, because of an electrical failure, the control system is operating in degraded mode using only the resisting force spring system.

The invention also consists in a system for controlling the positioning of control surfaces, in particular pitch and roll control surfaces, of an aircraft having a cockpit with dual controls, noteworthy in that it comprises a control system as defined hereinabove.

In the context of specific application of that control system to an aircraft, it may then be advantageous, if said aircraft is equipped with an automatic pilot installation, for each of said control circuits to comprise switching means for selectively applying to them either said control column position input signal or the output signal of said automatic pilot installation.

BRIEF DESCRIPTION OF THE DRAWINGS

Other features of the invention will emerge in the course of the following description, which is given by way of example only and with reference to the appended drawings, in which.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is described hereinafter in its application to controlling the roll and pitch control surfaces of an aircraft, in which case the controlled members are the ailerons and the pitch control surface of the aircraft.

Note, however, that the invention may be applied to other types of controlled member where dual control applies, whether in the field of avionics or in other technical fields.

Figure 1:
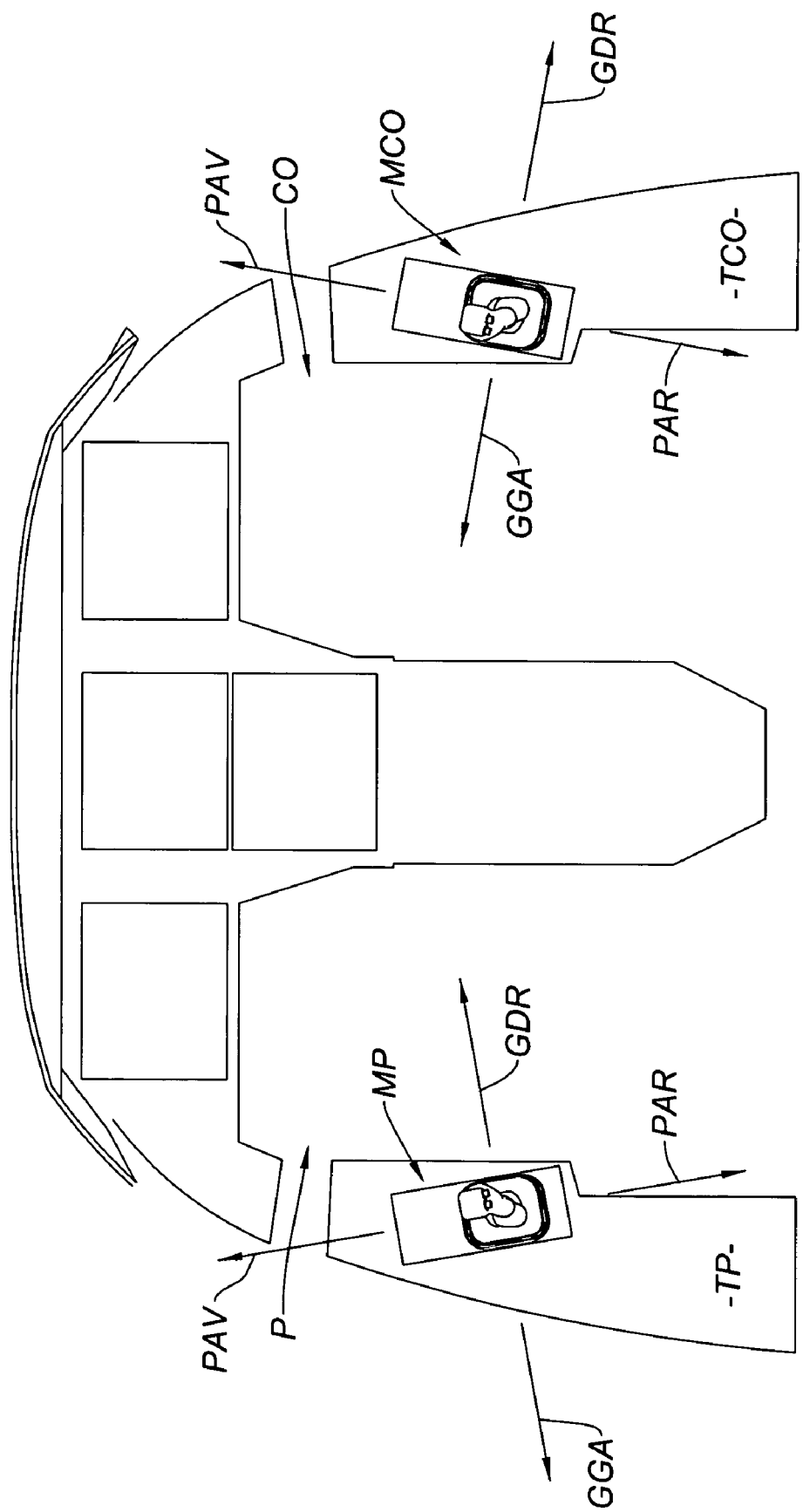
FIG. 1 is a diagrammatic plan view of a cockpit of an aircraft with dual controls to show the layout of two laterally disposed control columns electrically coupled to each other in accordance with the invention.

This being the case, FIG. 1 represents one example of the layout of the pitch and roll axis control columns in an aircraft cockpit with dual controls. On the left of the cockpit is the station P for the pilot and on the right the station CO for the co-pilot. The control columns MP and MCO are installed on lateral consoles TP and TCO in the cockpit, respectively to the left of the pilot station P and to the right of the co-pilot station CO.

According to conventions that are well known in the art, pitch control is achieved by moving each control column MP or MCO respectively forward (arrow PAV—dipping the nose of the aircraft) and backward (arrow PAR—raising the nose of the aircraft). Roll control is obtained by moving each control column MP or MCO respectively to the right (arrow GDR—rolling the aircraft to the right) or to the left (arrow GGA—rolling the aircraft to the left).

Note that FIG. 1 represents only one example of the layout of electrically coupled control columns. The invention applies equally to other arrangements, for example in aircrafts in which the pilots are in two separate cockpits, situated one behind the other, as is often the case in military aircraft. Consequently, the control columns MP and MCO may be installed in the same space and visible to both pilots or in separate spaces in which, by examining his own control column, each pilot can perceive actions applied by the other pilot to his own control column.

Figures 2A, 2B:
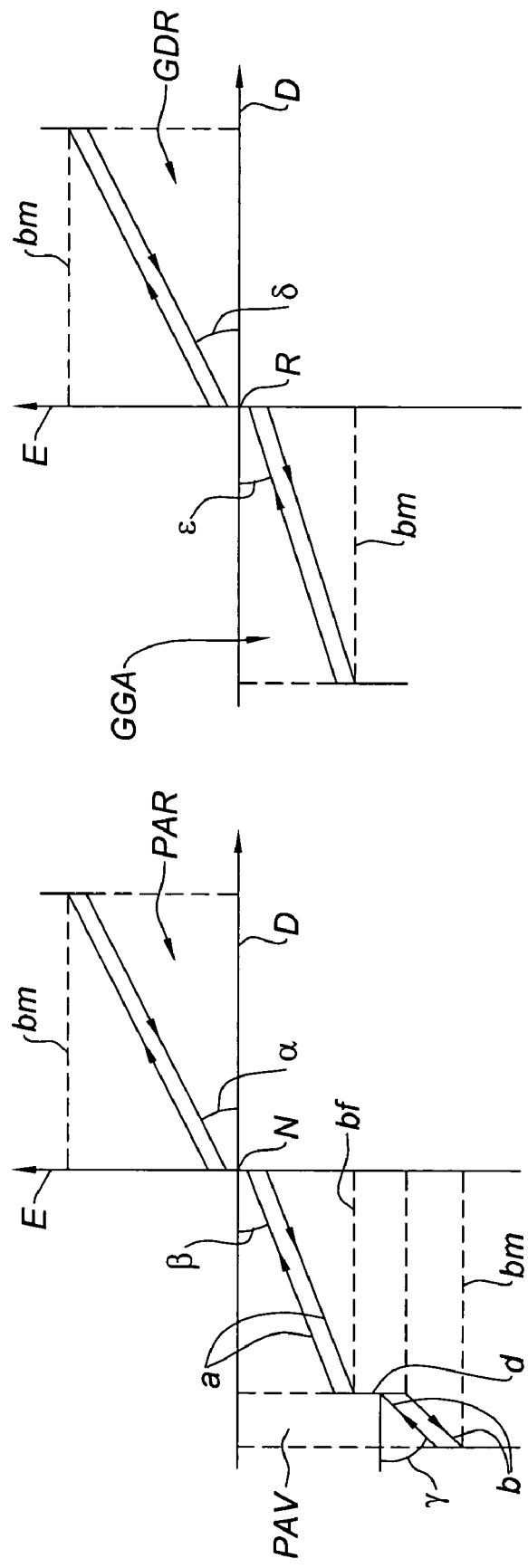
FIGS. 2A and 2B are diagrams of one example of the laws governing the ratio between the resisting force exerted on the FIG. 1 control columns, as a function of a movement signal generated by the application of that force by the pilot, the diagrams relating respectively to controlling each of the two degrees of freedom, namely pitch control and roll control in an aircraft in the present example.

FIGS. 2A and 2B represent, for the pitch axis and the roll axis, respectively, examples of laws of the resisting force as a function of the movement of the control column which can be used in the control system of the invention. Note, however, that the resisting force laws shown are not limiting on the invention, as other resisting force laws may be used in a control system of the invention.

Referring first to FIG. 2A, it is seen that the displacement D of the control column in each direction from its intermediate neutral point N is limited by an immovable stopping point bm, the resisting force E/displacement D curve being linear for the displacement PAR and virtually linear for the displacement PAV.

For ergonomic reasons that allow for the fact that the strength of the hand is greater in traction (movement toward the body) than in thrust (movement in the opposite direction), the slope a of the curve for the displacement PAR is greater than that β of the curve for the displacement PAV. The pilots therefore experience a higher resisting force in the direction PAR than in the direction PAV.

However, the curve for the displacement PAV features a discontinuity d and therefore has a section a of slope β used under routine flight conditions and a section b of greater slope γ than the slopes α and β and corresponding to hazardous flight conditions, i.e. pronounced dipping of the nose of the aircraft. For safety reasons, the positions of the control column corresponding to the end of the section a and the beginning of the section b (considered in the direction of displacement towards a greater angle of the pitch control surface), are separated by a movable stopping point bf. In other words, beyond a certain degree of dipping of the nose of the aircraft, the pilots will experience a high resisting force that they must overcome to go to a greater degree of dip. What is more, beyond this point the resisting force E increases very strongly.

FIG. 2B illustrates the resisting force law for roll control. The diagram represented is that for the control column MCO of the co-pilot station CO (FIG. 1), the diagram (not shown in the drawing) for the control column MP of the pilot station P being a mirror image of that for the co-pilot.

The curves of this diagram are linear but, as in the FIG. 2A diagram, there is also a differentiation in respect of the slope of the curves. In the situation represented, which is that of the control column MCO, the curve for the direction GDR of movement of the control column (towards the outside of the cockpit in the case of the control column MCP) has a slope δ greater than the slope ε corresponding to the displacement GGA (towards the inside of the cockpit). As already indicated, this differentiation is reversed for the resisting force on the control column MP.

Note that the immovable stopping points bm referred to above are preferably mechanical end of travel stops incorporated into the mechanism of each control column, whereas the movable stopping points bf are particular features of the force laws embodied in the electronics.

Figure 3:
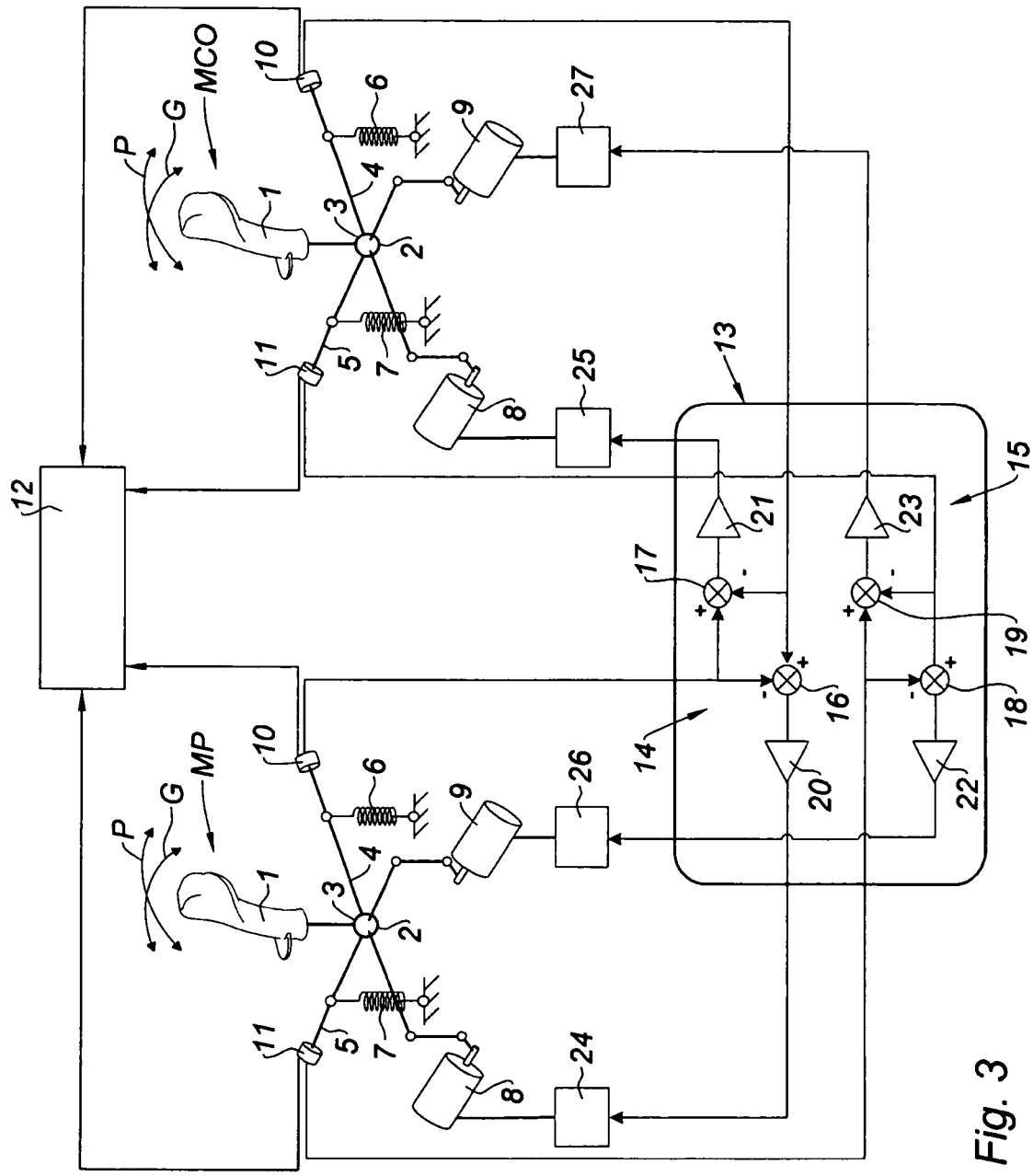
FIG. 3 is a simplified diagram of a system of the invention for pitch and roll control of an aircraft using two electrically coupled control columns.

Refer next to FIG. 3, which is a simplified diagram of a preferred embodiment of the system of the invention for pitch and roll control.

The system comprises the two control columns MP and MCO already shown in FIG. 1. They are of identical construction.

Each control column takes the form of a handgrip 1 mounted on a gimbal 2 associated with mechanical guide means (not shown) that limit movement of the handgrip 1 to angular displacements about the centre 3 of the gimbal 2 with two degrees of freedom oriented in two perpendicular planes, one of the degrees of freedom being associated with the pitch control axis and the other with the roll control axis, indicated by the arrows P (pitch) and G (roll), respectively. Handgrips or control columns of this type are well known in the art and a detailed description of them can therefore be dispensed with here.

To understand the invention, suffice to say that to each degree of freedom there corresponds a movement transmission system that may be represented as a lever 4, 5 pivoting about the centre 3 of the gimbal 2.

Each lever 4, 5 is coupled to the associated handgrip 1 and can therefore be pivoted about the centre 3 of the gimbal 2 by the pilot and the co-pilot, respectively.

According to an important feature of the invention, this manual pivoting movement is opposed by respective resisting force spring systems 6, 7 each comprising, for example, one or more springs attached to one of the branches of the lever 4, 5 and to a fixed point of the structure of the control system.

The springs are tension coil springs, for example, whose spring characteristics are selected as a function of what is required.

The other branches of the levers 4, 5 are coupled to respective actuators 8, 9 adapted to pivot the corresponding levers about the centres 2. Each actuator may be a gear motor coupled by an appropriate linkage to the associated lever in order to pivot it as a function of the angular displacement of the rotor of the motor.

In a preferred embodiment, the motor of each actuator 8, 9 is of the autosynchronously controlled three-phase type. Control is effected by means of a sinusoidal current applied to the three phases. Each motor is designed to produce very low mechanical locking between stator and rotor, a low friction hysteresis torque and a sinusoidal back-emf.

The levers 4 and 5 are additionally coupled to respective sensors 10 and 11 that measure their pivoting continuously. Thus these sensors each deliver a set point signal for the movement of the corresponding control surfaces of the aircraft (ailerons and pitch control surface—not shown) to a flight computer 12 that generates corresponding control signals for conventional drive units (also not shown) for moving those surfaces. The position sensors 10 and 11 may be of the XVDT, potentiometer or like type.

The control system also comprises a control computer 13 for the control columns MP and MCO that essentially comprises two control circuits 14 and 15 respectively associated with the pitch and roll axes (and here are represented in a highly diagrammatic manner).

Each control circuit comprises two adders 16, 17 and 18, 19 and two amplifiers 20, 21 and 22, 23 connected as follows.

The – input of the adder 16 and the + input of the adder 17 are connected to the position sensor 10 of the control column MP and the + input of the adder 16 and the – input of the adder 17 are connected to the position sensor 10 of the control column MCO.

The – input of the adder 18 and the + input of the adder 19 are connected to the position sensor 11 of the control column MP and the + input of the adder 18 and the – input of the adder 19 are connected to the position sensor 11 of the control column MCO.

The output of the adder 16 is connected to a driver circuit 24 of the actuator 8 of the control column MP via the amplifier 20, the output of the adder 17 is connected to a driver circuit 25 of the actuator 8 of the control column MCO via the amplifier 21, the output of the adder 18 is connected to a driver circuit 26 of the actuator 9 of the control column MP via the amplifier 22, and the output of the adder 19 is connected to a driver circuit 27 of the actuator 9 of the control column MCO via the amplifier 23.

This continuously copies to one of the control columns MP or MCO the position of the other control column with resisting forces produced by the springs 6 and 7. Thus in each control circuit the force applied to either control column and the resisting torque resulting from the resisting force law applied to each control column will be regarded as a disturbance opposed by the actuator 8 or 9 controlled by the corresponding control circuit 14 or 15.

Figure 4:
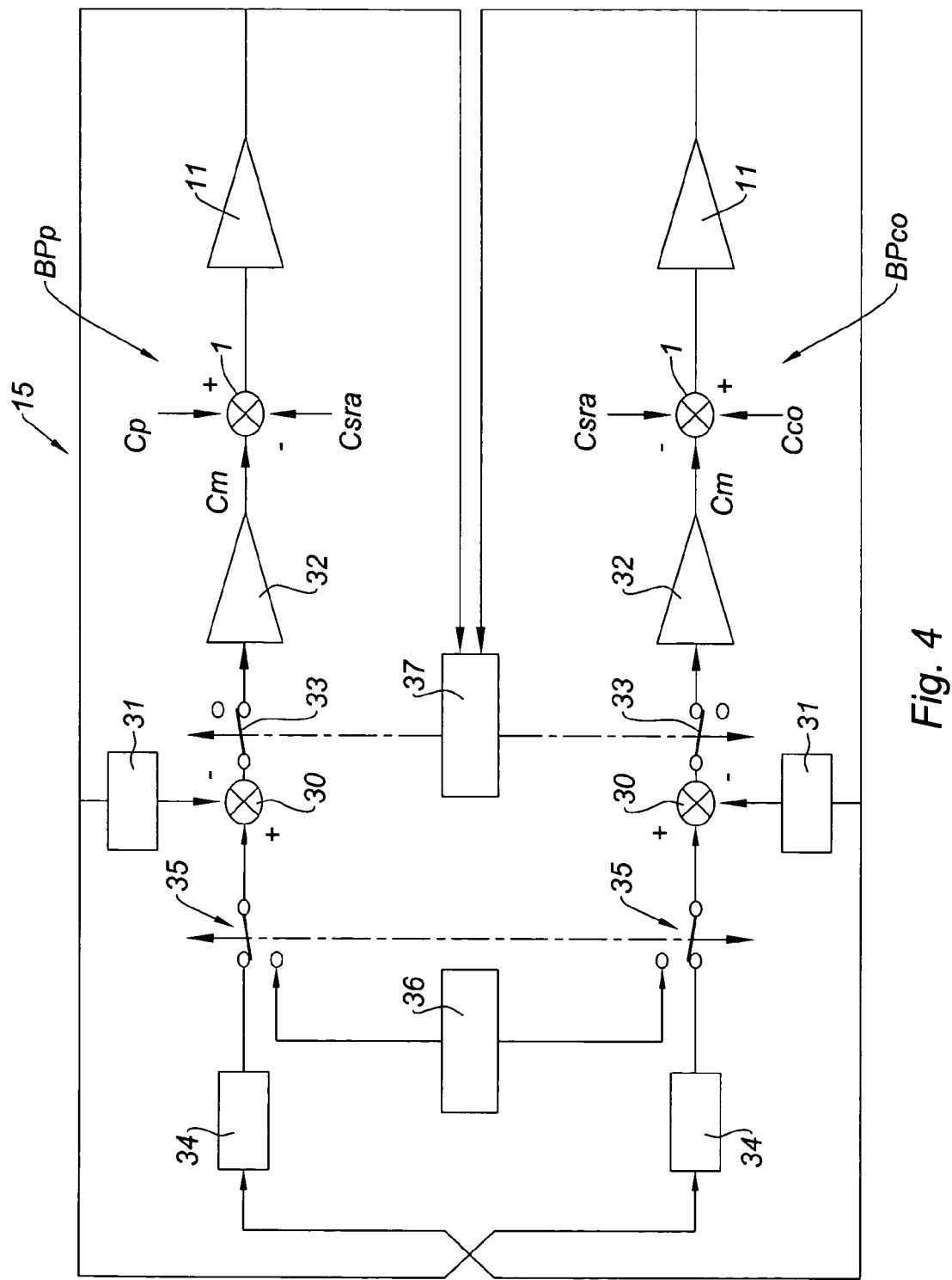
FIG. 4 is a functional block diagram of the pitch control system of the FIG. 3 control system.
Figure 5:
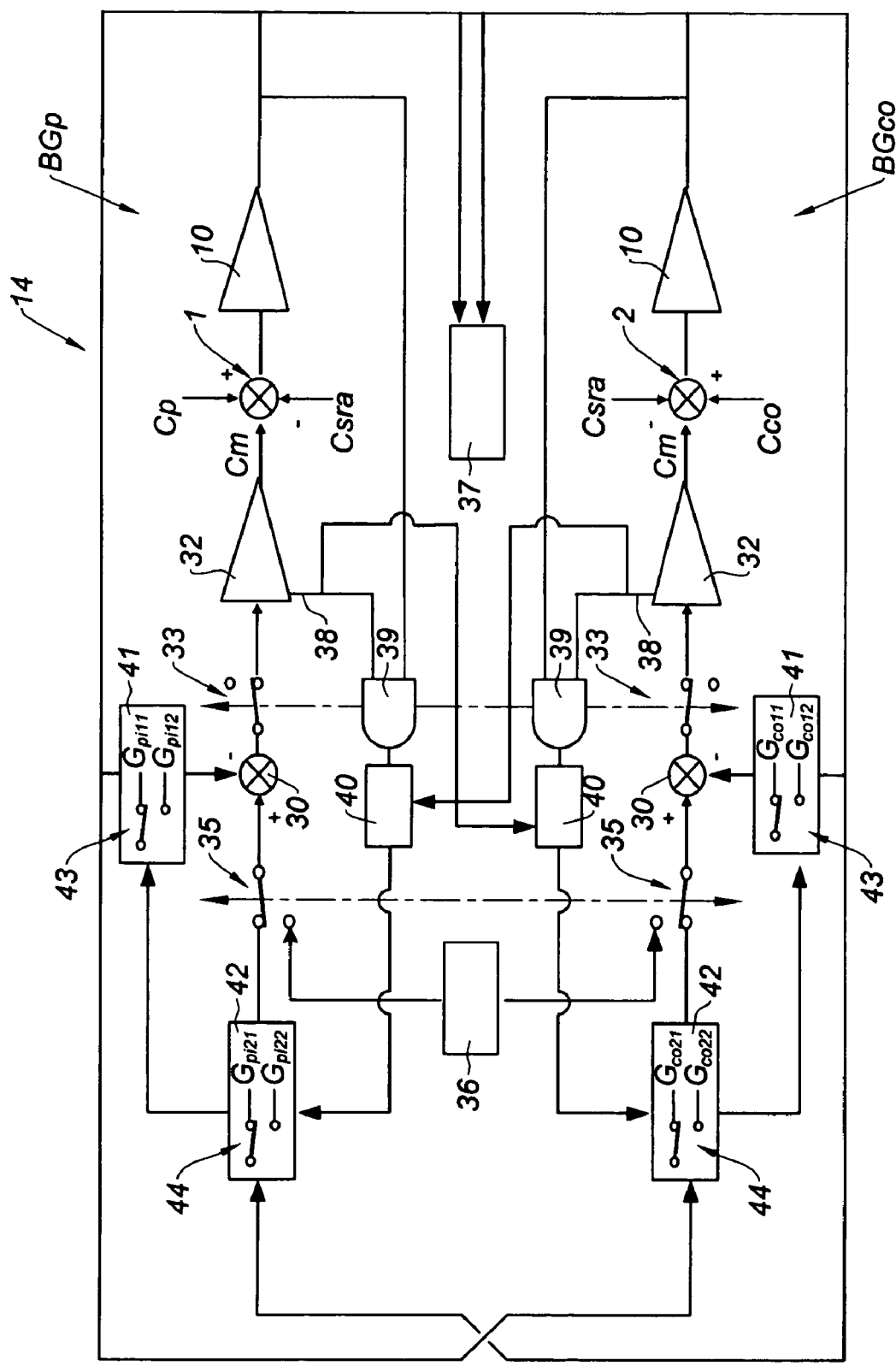
FIG. 5 is a functional diagram of the roll control system of the FIG. 3 control system.

Refer now to FIGS. 4 and 5 which are more detailed functional block diagrams of the control circuit for the pitch axis (FIG. 4) and the roll axis (FIG. 5) for the two control columns 1 and 2, these circuits being embodied in the portions 15 and 14, respectively, of the computer 13 represented in FIG. 3.

In FIGS. 4 and 5, the control columns 1 and 3 are symbolically represented by an "adder" and the following torques are exerted on them:

a manual torque Cp or Cco resulting from the action of the pilot or the co-pilot, respectively, a resisting torque Csra on each control column produced by the spring 6 or 7, and a drive torque Cm applied to each control column by the actuator 8 or 9.

In the case of the pitch axis, to which FIG. 4 relates, the position of each control column 1 and 2 is detected by the associated sensor 11 which forms part of a control loop BPp, respectively BPco, further comprising an adder 30 and a variable gain amplifier 31 whose input is connected to the output of the sensor 11 and whose output is connected to the − input of the adder 30. The output signal from the latter is fed to a power amplifier 32 via a switch 33, the output of this power amplifier delivering a control signal to the actuator 9 to produce the torque Cm.

In each control loop BPp and BPco, the sensor 11 is also connected via a variable gain amplifier 34 to the + input of the adder 30 of the other control loop. This cross-connection is provided by a switch 35. This enables the movement of each control column relative to the pitch axis to be slaved to the movement of the other control column relative to the same axis. Note that the FIG. 4 arrangement implements the control law represented in FIG. 2A or any other control law that might be required by appropriately adapting the gain of the amplifiers 31 and 34.

Furthermore, each of the control loops BPp and BPco preferably also incorporates a set of electronic filters advantageously integrated into the amplifiers 31 and/or 34 to produce a damping effect in the control of the movement of the control columns, which effect may be comparable to that obtained in the mechanical domain by means of a hydraulic dashpot, in accordance with principles well known to the person skilled in the art.

The switches 35 connect the control loops BPp and BPco to an automatic pilot 36 so that the control columns 1 and 2 can track movements of the pitch control surface when the automatic pilot is engaged. In this situation, the two switches 35 occupy the position opposite that represented in FIG. 4.

The switches 33 select a degraded mode of pitch control if the sensors 10 supply output signals differing from each other by a predetermined amount. This is why the outputs of the sensors 10 are connected to a difference detector circuit 37 that operates on the switches 33 to open the control loops, where appropriate, for example if different actions are applied by the pilots to their respective control columns or in the event of an electronic failure.

FIG. 5 relates to roll control, to which a control law like that represented in FIG. 2B is applicable. Note that this kind of law is intended to generate a resisting force torque that differs according to whether the control column 1 or 2 is on the user's left (pilot) or right (co-pilot).

FIG. 5 uses some reference numbers from FIG. 4 to designate components with the same function. The circuit also comprises two control loops, a pilot loop BGp and a co-pilot loop BGco, to which loops the sensors 10 are connected.

To differentiate the resisting torques according to where the control column is located relative to the user, each loop BGp and BGco is provided with additional components compared to the FIG. 4 arrangement.

Each amplifier 32 has an additional output 38 that indicates the direction of the movement imparted to the corresponding control column 1 or 2. This information, together with the displacement of the control column supplied by the sensor 10, is fed to an AND circuit 39 in which the information is combined appropriately. The combined result is stored in a memory 40. The signal stored in the memory is applied to variable gain amplifiers 41 and 42 whose function is similar to that of the amplifiers 31 and 34 in FIG. 4. The amplifiers 41 and 42 are preferably provided with electrical filters analogous to those in the latter amplifiers, as described with reference to FIG. 4. However, in FIG. 5, each amplifier also has a gain switching function controlled by the signal in the memory 40 and symbolized by the respective switch 43 or 44.

In other words, a particular direction of movement of a control column assigns a particular gain factor to the amplifiers 41 and 42 so that the resisting torque generated by the motor 8 in that control column corresponds to that direction of movement. For example, the torque may change in accordance with the FIG. 2B control law with a slope δ or with a slope ε according to whether the pilot or the co-pilot is moving his control column to the right or to the left.

Note that the content of the memory 40 is deleted or changed as soon as the direction information supplied at the output 38 of the amplifier 32 is modified by reversing the direction of movement imparted to the control column 1 or 2 concerned.

The foregoing description of the control system of the invention shows that the invention offers the possibility of completely synchronising the movements of the two control columns, so that the pilot or the co-pilot can be continuously aware, through visual observation or from the feel of his own control column, of movements applied by his colleague to the other control column.

In the event of double action, the force exerted by each of the pilots will be felt in its entirety by the other pilot, as if there were a mechanical connection between the two control columns.

If a difference is detected between the actions exerted by the pilots, i.e. if the output signals of the sensors 10 or 11 differ from each other, all the electrical functions are cut off. If the actuators are three-phase electric motors, it is preferable for their windings be short-circuited by an appropriate switching device, not described here, but the implementation of which will not pose any problem for the person skilled in the art. In this situation the control loops BPp, BPco, BGp and BGco are also opened by the switches 33 shown in FIGS. 4 and 5.

If an electrical function of the control system fails, the system operates in a degraded mode in which the control columns are decoupled from each other, the resisting force function being then provided independently by the springs 6 and 7. The control system may be designed so that these forces are at least 90% of the resisting forces when the electrical functions are fully operative. The electrical system therefore adds an adjustable top-up to the resisting forces produced by the springs 6 and 7.

In this situation it is highly advantageous to use the switching system just referred to for short-circuiting the actuator motors in the event of an electrical fault, to obtain a damping effect resulting from the short-circuiting of the windings of the motors. This effect may then be similar to that of the electrical filters associated with the amplifiers 31, 35 and 41, 42.

It has also been found that the control system of the invention allows the introduction of functions linked to automatic pilot by way of the switches 35 (FIGS. 4 and 5). When those functions are activated, the control columns 1 and 2 obey instructions issued by the automatic pilot computer. In this case the control columns may also be immobilised in the neutral position, with the provision for the pilots to override this if necessary.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A control system for placing controlled members in required positions, comprising two control columns, each of which is mounted on a gimbal and has two degrees of freedom assigned to the respective controlled members to be moved, and, for each of said control columns, and assigned to said respective degrees of freedom:
   a) two actuators for applying to their associated control column either a resisting torque or a displacement torque for the associated degree of freedom,
   b) two control circuits each of which is adapted:
      on the one hand, to control the actuator for the associated degree of freedom so that the actuator supplies a resisting torque opposing each manipulation of a first of the control columns exerted for that degree of freedom, and
      on the other hand, to bring about, as a function of said manipulation of the first control column, a displacement of the second control column of the same amplitude, in the same direction and for the same degree of freedom,
   c) two control column position sensors for supplying to the respective control circuits an associated control column position signal,
   said control system further comprising:
   d) a mechanism for controlling displacement of said controlled members as a function of signals supplied by said control column position sensors,
      wherein each control column is further provided with a mechanical spring system comprising for each of said degrees of freedom a return spring assembly for spring-loading the associated control column into its neutral position and adapted to provide, in the event of manipulation of the corresponding control column, a resisting torque in support of the resisting torque supplied by the associated actuator.

2. The control system according to claim 1, wherein said return spring assemblies are configured so that in an absence of resisting torques supplied by said actuators said assemblies generate approximately 90% of the respective total resisting torques that are applied to the control columns when said actuators supply their corresponding resisting torques.

3. The control system according to claim 1, wherein said control circuits are adapted to control said associated actuators in such a manner as to generate at least one end of travel stopping point felt when manipulating said control columns in both directions of displacement thereof for each of said degrees of freedom.

4. The control system according to claim 3, wherein the control circuit associated with at least one of said degrees of freedom is adapted to control said associated actuators in such a manner as to generate two successive mechanical stopping points of which one is a stopping point that can be overridden and the other is an end of travel stopping point, these stopping points being felt when manipulating the control column in at least one direction for the degree of freedom concerned.

5. The control system according to claim 3, wherein each of said control circuits comprises two interconnected control loops assigned to a degree of freedom of each of said control columns and each comprising an amplifier for supplying a drive signal to said actuators and an adder that are connected to the input of the amplifier and to which said control column position sensors for each control column assigned to the same degree of freedom are connected, the control column position signals of said sensors being applied to said adder with opposite signs.

6. The control system according to claim 5, wherein each of said control loops includes a first variable gain amplifier and a second variable gain amplifier respectively connected between said sensors and said adder, said variable gain amplifiers determining in said control loop for respective movements of the control columns on either side of a neutral point predetermined laws of variation of the resisting torque generated by the actuator controlled by that loop as a function of the displacement of the respective control column concerned.

7. The control system according to claim 6, wherein said predetermined variation laws are linear or quasi-linear.

8. The control system according to claim 7, wherein the linear or quasi-linear variation laws respectively associated with each degree of freedom of the control columns have different slopes for displacements of those control columns to either side of the neutral point.

9. The control system according to claim 8, wherein the variable gain amplifiers of the control loops assigned to at least one of the degrees of freedom can be switched to reverse the slopes of the corresponding variation laws according to whether the control column concerned is to the left or to the right of a user, a memory being provided in each of the control loops assigned to the same degree of freedom to maintain the slopes of the variation laws until the direction of displacement of the control column is reversed.

10. The control system according to claim 5, wherein each of said control loops includes electronic filters to produce a damping effect in the control of the movements of the control columns.

11. The control system according to claim 1, also comprising a mechanism for rendering said control circuits inoperative if the control column position signals supplied by said sensors assigned to the same degree of freedom differ from each other by a predetermined amount.

12. The control system according to claim 1, wherein said actuators are three-phase electric motors controlled by sinusoidal currents.

13. The control system according to claim 12, comprising a switching device for short-circuiting the windings of said motors.

14. A system for controlling the positioning of pitch and roll control surfaces, of an aircraft having a cockpit with dual controls, comprising a control system for placing controlled members in required positions, said control system including two control columns, each of which is mounted on a gimbal and has two degrees of freedom assigned to the respective controlled members to be moved, and, for each of said control columns, and assigned to said respective degrees of freedom a) two actuators for applying to their associated control column either a resisting torque or a displacement torque for the associated degree of freedom, b) two control circuits each of which is adapted on the one hand, to control the actuator for the associated degree of freedom so that the actuator supplies a resisting torque opposing each manipulation of a first of the control columns exerted for that degree of freedom, and on the other hand, to bring about, as a function of said manipulation of the first control column, a displacement of the second control column of the same amplitude, in the same direction and for the same degree of freedom, c) two control column position sensors for supplying to the respective control circuits an associated control column position signal, and d) a mechanism for controlling displacement of said controlled members as a function of signals supplied by said control column position sensors, wherein each control column is further provided with a mechanical spring system comprising for each of said degrees of freedom a return spring assembly for spring-loading the associated control column into its neutral position and adapted to provide, in the event of manipulation of the corresponding control column, a resisting torque in support of the resisting torque supplied by the associated actuator.

15. The system according to claim 14, wherein, said aircraft being equipped with an automatic pilot installation, each of said control circuits comprises a switching mechanism for selectively applying to said control circuits either said control column position signal or an output signal of said automatic pilot installation.

* * * * *

UNITED STATES PATENT AND TRADEMARK OFFICE
CERTIFICATE OF CORRECTION

PATENT NO. : 7,648,106 B2  Page 1 of 1
APPLICATION NO. : 11/476767
DATED : January 19, 2010
INVENTOR(S) : Granier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 717 days.

Signed and Sealed this

Sixteenth Day of November, 2010

David J. Kappos
*Director of the United States Patent and Trademark Office*